July 1, 1958 A. H. TOD 2,841,066

CARD MOUNTING STRUCTURE

Filed July 22, 1954 2 Sheets-Sheet 1

INVENTOR.
Allan H. Tod
BY
Gary, Desmond & Parker
Attys.

July 1, 1958 — A. H. TOD — 2,841,066

CARD MOUNTING STRUCTURE

Filed July 22, 1954 — 2 Sheets-Sheet 2

INVENTOR.
Allan H. Tod
BY
Gary, Desmond & Parker
Attys

United States Patent Office 2,841,066

Patented July 1, 1958

2,841,066

CARD MOUNTING STRUCTURE

Allan H. Tod, Charlottesville, Va., assignor to Acme Visible Records, Inc., Crozet, Va., a corporation of Delaware Application July 22, 1954, Serial No. 445,026

4 Claims. (Cl. 95—85)

This invention relates to a card mounting structure adapted for use in arranging and supporting record cards to be photographed to thus facilitate the production of duplicate records, and is more particularly concerned with the provision of a structure adapted to support record cards of the type adapted to be arranged in internested, overlapping relationship on a card holder of a visible card index.

An object of the invention resides in the provision of a card mounting structure comprising a plurality of card carriers adapted to be adjustably positioned upon a base, each carrier having runway flanges along its upper surface for detachable engagement with the lugs or ears provided on conventional record cards.

Another object of the invention resides in the provision of a card mounting structure in which each card carrier is provided with card supports disposed on opposite sides of and coplanar with the runway flanges to maintain record cards mounted thereon in a flat condition.

A further object of the invention resides in the provision of a base having spaced runway channels to receive attachment flanges extending along the lower surface of each card carrier.

Another object of the invention resides in the provision of a card mounting structure in which four record card carriers may be spaced apart longitudinally or transversely on the base to suit the requirements of the user in making a photograph which is then used to make a printing plate for printing sheets for duplicate record books. Each printed sheet may be cut apart to form either two or four individual book pages, if desired.

This invention embodies other novel features, details of construction and arrangement of parts which are hereinafter set forth in the specification and claims and illustrated in the accompanying drawing, wherein:

Figure 1:
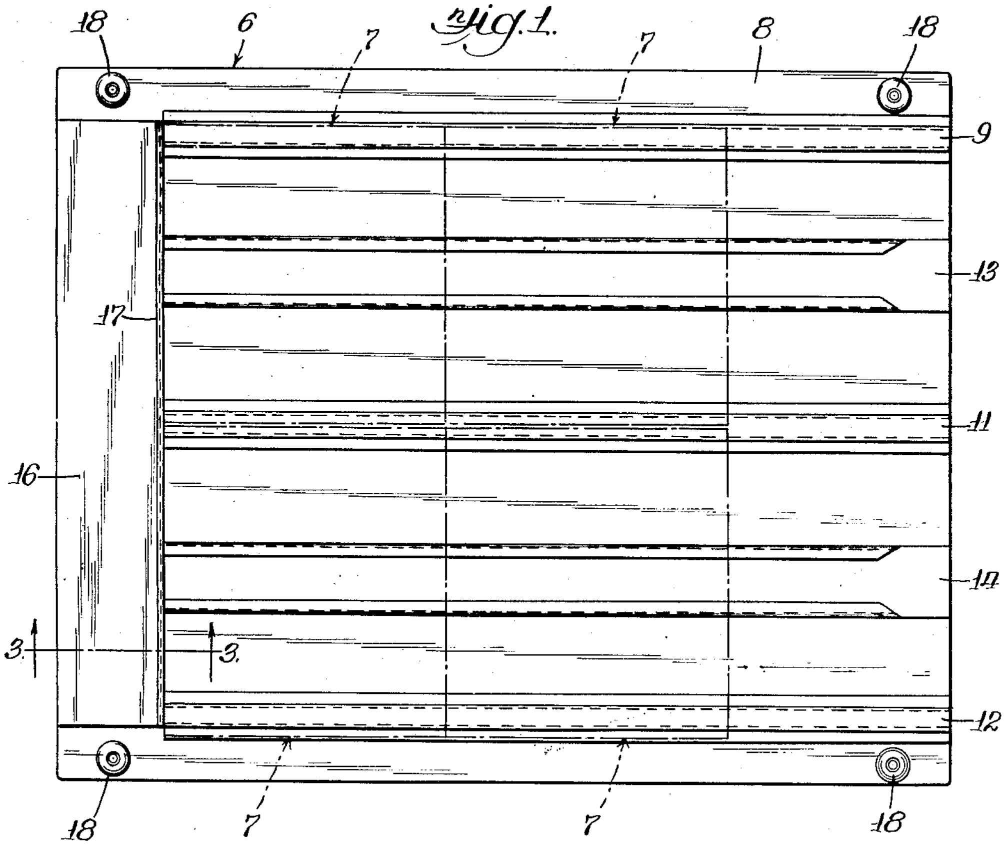
Fig. 1 is a top plan view illustrating the base of the card mounting structure.
Figure 2:
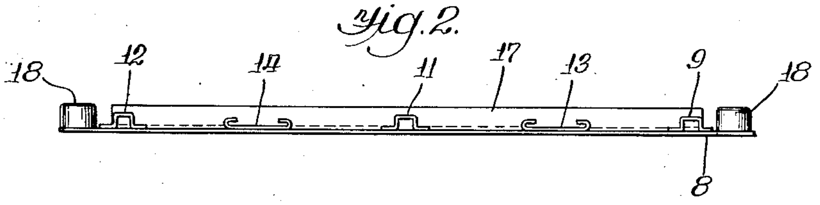
Fig. 2 is an end elevational view of same.
Figure 3:
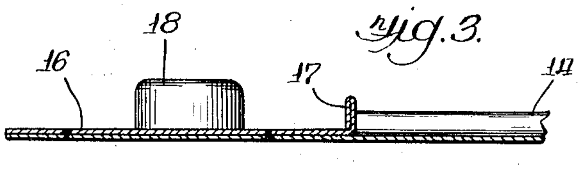
Fig. 3 is a fragmentary sectional view taken along the line 3—3 of Fig. 1.
Figure 4:
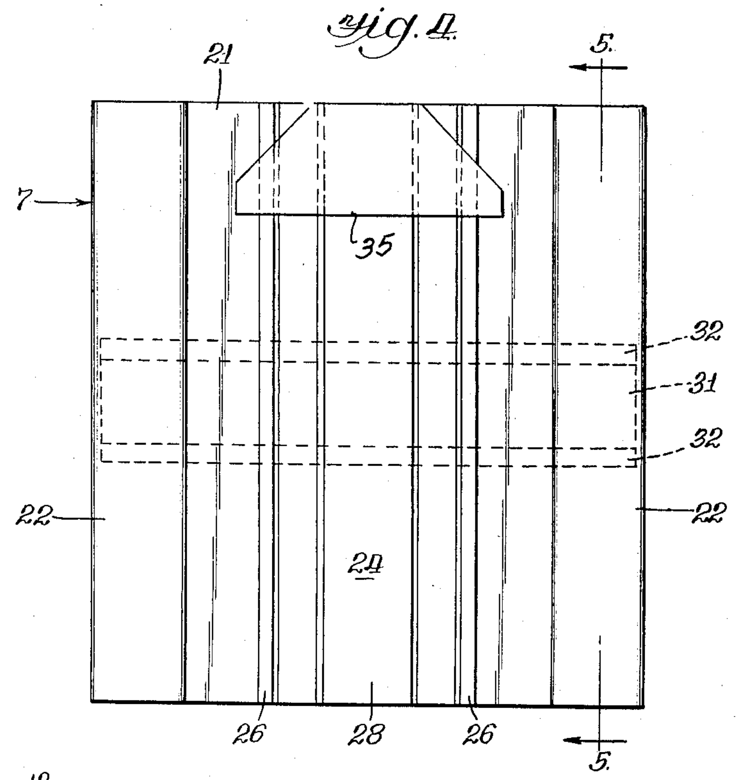
Fig. 4 is a top plan view showing a card carrier adapted to be adjustably positioned upon the base.
Figure 5:
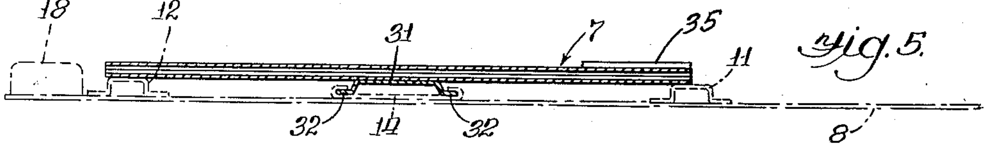
Fig. 5 is a sectional view taken along the line 5—5 of Fig. 4.
Figure 6:
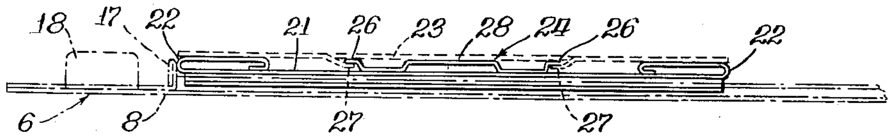
Fig. 6 is an end elevational view of the carrier.
Figure 7:
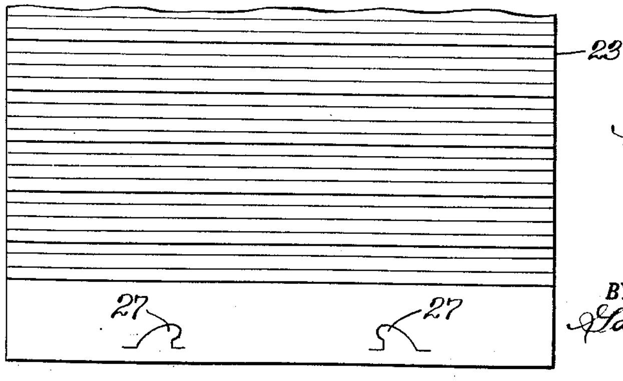
Fig. 7 is a plan view showing a conventional type of record card adapted to be mounted upon the card carrier.

Referring now to the drawings for a better understanding of the invention, the card mounting structure is shown as comprising a base or tray 6 adapted to support, for example, four card carriers 7.

The base 6 is shown as comprising a flat rectangular panel 8 preferably blanked from sheet metal, such as aluminum. Identical upper, lower and central rails 9, 11, and 12, respectively, are arranged in spaced parallel relationship on the panel and secured thereto by any suitable means, such as spot welding.

Identical upper and lower runway channels 13 and 14, respectively, are arranged on the panel on opposite sides of and parallel to the central rail 12, the channels being secured to the panel by suitable means such as spot welding. The rails and channels are also preferably blanked and formed from sheet metal, such as aluminum.

A stop member 16, blanked and formed of sheet metal, such as aluminum, is secured to panel 8 by spot welding and provided with an abutment flange 17 disposed in a plane normal to the rails and channels and engaging adjacent ends thereof. The panel is provided on its upper side with resilient rubber pads 18 adapted to support a sheet of transparent plate glass (not shown).

As heretofore pointed out, the base or tray 6 is, for example, adapted to support four identical card carriers 7. Each card carrier is shown as comprising a flat body 21 formed of sheet metal, such as aluminum, the ends of the metallic sheet being bent to form spaced parallel rails 22—22 to support record cards 23 in a flat condition above the body.

A card runway 24 is secured, as by spot welding, to the body 21 between and parallel to the rails 22—22 to provide spaced parallel flanges 26—26 to engage flexible tabs 27—27 of conventional record cards 23, in a manner well known in the card index art. The card runway is provided with a central portion 28 coplanar with the flanges 26—26 to support the medial portion of record cards.

Each carrier 7 is provided on its under surface with a mounting member 31 extending transversely of the rails 22—22 and card runway 24. The mounting member 31 is blanked and formed from sheet metal, such as aluminum, to provide parallel side flanges 32—32 for sliding engagement within the channels 13 and 14 provided on the base 6. The mounting member may be secured to the carrier body 21 by spot welding. If desired, card stop members 35 may be spot welded or otherwise secured to the card carrier runways 24 for abutting engagement with their related cards 23.

In the use of the card mounting structure, the mounting member 31 of each carrier 7 is slidably engaged within one of the runway channels 13 or 14 provided on the base 6, and two carriers may, for example, be associated with each channel. For alignment purposes, the card carriers may be moved inwardly along their respective channels 13 and 14 until brought to rest against the abutment flange 17 of the stop member 16. The record card tabs 27—27 are engaged under the flanges 26—26 to mount the cards on their respective carriers 7.

It will be noted that the record cards 23 may be disposed in a common plane and suitably spaced from each other either longitudinally or transversely of the base 6 for photographic purposes preceding the making of a printing plate employed to print duplicate record sheets; after which, such record sheets may form individual book pages or may, if desired, be cut to form either two or four individual pages. Prior to being photographed, the record cards 23 may be engaged and covered with a sheet of transparent glass to press the cards flat against their respective carriers.

While the invention has been shown in but one form, it is obvious to those skilled in the art that it is not so limited, but is susceptible of various changes and modifications without departing from the spirit and scope of the claimed invention.

I claim as my invention:

1. A structure for facilitating unitary photographic reproduction of lines of indicia separately contained on a plurality of record cards of the class wherein a plurality of record cards embodying indicia on one marginal edge portion are disposed in edgewise spaced overlapping relationship on an elongated carrier runway by means of tab pairs on each card projecting toward each other adjacent an intermediate portion of the card opposite the indicia bearing edge, comprising a card carrier in slidable engagement with a supporting base; said carrier comprising a flat metallic sheet, an elongated card runway secured thereto and projecting centrally of and above one surface thereof, a pair of spaced rail members on said surface parallel to said runway for supporting the side edges of cards engaged on said runway in plane parallel relationship to said sheet, and a flanged mounting member secured to and projecting centrally of and below the opposite face of said sheet and at right angles to said card runway; said supporting base comprising a flat metallic sheet, a runway channel secured thereon receiving said flanged mounting member in slidable edgewise embracing engagement, and a pair of spaced rail members on said base parallel to said runway channel for supporting the side edges of said engaged card carrier in plane parallel relationship to said base member.

2. A structure for facilitating unitary photographic reproduction of lines of indicia separately contained on a plurality of record cards of the class wherein a plurality of record cards embodying indicia on one marginal edge portion are disposed in edgewise spaced overlapping relationship on an elongated carrier runway by means of tab pairs on each card projecting toward each other adjacent an intermediate portion of the card opposite the indicia bearing edge, comprising a plurality of aligned card carriers in slidable engagement with a supporting base; said carrier comprising a flat metallic sheet, an elongated card runway secured thereto and projecting centrally of and above one surface thereof, a pair of spaced rail members on said surface parallel to said runway for supporting the edges of cards engaged on said runway in plane parallel relationship on said sheet, and a flanged mounting member secured to and projecting centrally of and below the opposite face of said sheet and at right angles to said card runway; said supporting base comprising a flat metallic sheet, a plurality of spaced parallel runway channels secured thereon receiving said flanged mounting members in slidable edgewise embracing engagement, and spaced rail members on said base parallel to said runway channels for supporting the side edges of said engaged card carriers in plane parallel relationship to said base member.

3. A structure for facilitating unitary photographic reproduction of lines of indicia separately contained on a plurality of record cards of the class wherein a plurality of record cards embodying indicia on one marginal edge portion are disposed in edgewise spaced overlapping relationship on an elongated carrier runway by means of tab pairs on each card projecting toward each other adjacent an intermediate portion of the card opposite the indicia bearing edge, comprising a plurality of longitudinally and transversely aligned card carriers in slidable engagement with a supporting base; said carrier comprising a flat metallic sheet, an elongated card runway secured thereto and projecting centrally of and above one surface thereof, the side edges of said sheet being return bent on said surface and disposed parallel to said runway to provide support rails for the side edges of cards engaged on said runway, and a flanged mounting member secured to and projecting centrally of and below the opposite face of said sheet and at right angles to said card runway; said supporting base comprising a flat metallic sheet, a plurality of spaced parallel runway channels secured thereon receiving said flanged mounting members in slidable edgewise embracing engagement, spaced rail members on said base parallel to said runway channels for supporting the side edges of said engaged card carriers in plane parallel relationship to said base member, and abutment means on said base to engage and arrange the carriers mounted in one channel in alignment with the carriers mounted in another channel.

4. A structure for facilitating unitary photographic reproduction of lines of indicia separately contained on a plurality of record cards of the class wherein a plurality of record cards embodying indicia on one marginal edge portion are disposed in edgewise spaced overlapping relationship on an elongated carrier runway by means of tab pairs on each card projecting toward each other adjacent an intermediate portion of the card opposite the indicia bearing edge, comprising a plurality of aligned card carriers in slidable engagement with a supporting base; said carried comprising a flat metallic sheet, an elongated card runway secured thereto and projecting centrally of and above one surface thereof, the side edges of said sheet being return bent on said surface and disposed parallel to said runway to provide support rails for the side edges of cards engaged on said runway, abutment means for limiting movement of cards on each carrier, and a flanged mounting member secured to and projecting centrally of and below the opposite face of said sheet and at right angles to said card runway; said supporting base comprising a flat metallic sheet, a plurality of spaced parallel runway channels secured thereon receiving said flanged mounting members in slidable edgewise embracing engagement, spaced rail members on said base parallel to said runway channels for supporting the side edges of said engaged card carriers in plane parallel relationship to said base member, and spaced resilient bosses projecting from said base for supporting a transparent plate above said carriers and against the cards mounted thereon.

References Cited in the file of this patent

UNITED STATES PATENTS

| | | |
|---|---|---|
| 1,048,058 | Fisher | Dec. 24, 1912 |
| 2,081,841 | Shailor | May 25, 1937 |
| 2,635,607 | Gunn | Apr. 21, 1953 |